United States Patent [19]
Lübbers et al.

[11] 3,922,088
[45] Nov. 25, 1975

[54] METHOD AND APPARATUS FOR PHOTOMETRIC MEASUREMENT OF CONCENTRATION RATIOS

[75] Inventors: Dietrich W. Lübbers, Dortmund; Reinhard Wodick, Dortmund, Loh, Germany

[73] Assignee: Max Planck Gesellschaft, Gottingen, Germany

[22] Filed: Apr. 15, 1974

[21] Appl. No.: 461,150

[30] Foreign Application Priority Data
Aug. 27, 1973 Germany.............................. 2343097

[52] U.S. Cl. .................. 356/40; 250/564; 250/574; 356/186
[51] Int. Cl.² .......................................... G01N 33/16
[58] Field of Search ......................... 356/39, 40–42, 356/179, 180, 184, 186; 250/564, 574

[56] References Cited
UNITED STATES PATENTS

| | | | |
|---|---|---|---|
| 3,638,640 | 2/1972 | Shaw.................................. | 356/41 X |
| 3,825,342 | 7/1974 | Lübbers et al........................ | 356/41 |

OTHER PUBLICATIONS
ASTM, "General Techniques of Infrared Quantitative Analysis", Manual on Recommended Practices in Spectrophotometry, ASTM, Philadelphia, Pa., Second Edition, pp. 40–50, Dec., 1966.

Primary Examiner—Alfred E. Smith
Assistant Examiner—Matthew W. Koren
Attorney, Agent, or Firm—Michael S. Striker

[57] ABSTRACT

A method and apparatus for photometrically measuring the concentration ratio of two components in a two-component system comprising separately directing at least three of five monochromatic light beams of different wavelengths onto a first of two components of the two-component system while the components are separated from each other; in which each of the five monochromatic light beams of different wavelengths are separately directed onto the second of the two components of the two-component system while the two components are separated from each other; in which at least three of the five monochromatic light beams are separately directed onto the object to be measured while only the first component of the two-component system is present in the object; in which the five monochromatic light beams of different wavelengths are separately directed onto the object to be measured, while only the second component of the two component system is present in the object. In each case reflectivity and/or transmissivity measurements of the resulting intensities are made; these resulting intensities determine calibration intensities. Each of the five monochromatic light beams are then directed onto the object on which the measurements are to be made, and the resulting reflected system-intensities measured. The calibrating intensities together with the measured system-intensities are then utilized to determine the relative concentration of the two components in the two-component system.

12 Claims, 3 Drawing Figures

3,922,088

METHOD AND APPARATUS FOR PHOTOMETRIC MEASUREMENT OF CONCENTRATION RATIOS

BACKGROUND OF THE INVENTION

The present invention relates to a method for photometrically measuring the concentration ratio of two components in a two component system. In particular, the invention relates to a method for determining the degree of oxygenation in a hemoglobin-containing system. The word "system" through the specification and claims is taken to refer to any mixture, composition, object, or substance in which the two components are present. The components of the two component system are assumed to have different and distinct colors, or more specifically, reflection spectra. It is further assumed that the two components do not react with each other when they are mixed, so that each of the components preserves its original color in the two component system. An important example of a two component mixture is oxygenated and deoxygenated hemoglobin, which are two different colors. It is already known that the concentration ratio of oxygenated and deoxygenated hemoglobin in the blood affects the reflection spectra from the human skin. As early as the 1930's measurements of the oxygen concentration in blood have been made photometrically. These measurements, however, were made using only two or three arbitrary wavelengths, and were subject to a number of disturbing effects. As a result, the accuracy of such measurements was not always reliable.

The present invention more particularly relates to measuring the concentration ratio of oxygenated and deoxygenated hemoglobin in the blood-vessel and skin "system" by a direct and external photometric measurement on the surface of the skin.

SUMMARY OF THE INVENTION

It is an object of the invention to provide a method and apparatus for photometrically measuring the concentration ratio of two components in a two component system.

Another object of the invention is to provide a novel and improved method of measuring the oxygenated hemoglobin concentration ratio in blood from the reflection spectra of human skin.

Another object of the invention is to provide a method and apparatus for continually monitoring and measuring the oxygenated hemoglobin concentration ratio in the blood through photometric means.

Another object of the invention is to provide a method and arrangement for calculating the concentration ratio of two components in a two component system, given certain initial calibrating measurements and the system measurements.

The improved method and apparatus for photometrically measuring the concentration ratio of two components in a two-component system comprises the step of separately directing at least three of five monochromatic light beams of different wavelengths onto a first of two components of the two-component system while the components are separated from each other; in which each of the five monochromatic light beams of different wavelengths are separately directed onto the second of the two components of the two-component system while the two components are separated from each other; at least three of the five monochromatic light beams are separately directed onto the objects to be measured while only the first component of the two-component system is present in the object; and the five monochromatic light beams of different wavelengths are separately directed onto the object to be measured, while only the second component of the two component system is present in the object. In each case reflectivity and/or transmissivity measurements of the resulting intensities are made; these resulting intensities determine calibrating intensities. Each of the five monochromatic light beams are then directed onto the object on which the measurements are to be made, and the resulting reflected system-intensities measured. The calibrating intensities together with the measured system-intensities are then utilized to determine the relative concentration of the two components in the two-component system.

A key feature of the invention lies in the specific selection of the wavelength of the five monochromatic light beams. One of the wavelengths corresponds to a relative minima in the reflection spectrum of the two component system; two wavelengths correspond to the relative maxima in the reflection spectrum; and the remaining two wavelengths correspond to the wavelength which has the same reflected intensity as that of the relative minima wavelength.

A specific application of the teachings of the invention can best be described with reference to measuring the concentration ratio of oxygenated hemoglobin in the blood. The improved method of the present invention, initially requires that calibrating measurements be made separately on each of the components in the two component system, that is oxygenated blood and deoxygenated blood. These measurements are made in a test cuvette, with a spectroscope (such as described in Niesel, Rev. Sci. Instrum. 35, 578, (1964) ). Each sample is exposed to one particular wavelength of monochromatic light at a time and the resulting reflected intensity for each wavelength measured. The result is a series of 16 calibrating reflective intensity measurements. These measurements are then recorded and stored in a general purpose digital computer, or reflected as gain factors in a ten channel analog computer or signal processing system.

The spectroscope or photometer is now applied directly to the surface of the skin to measure the concentration ratio of oxygenated hemoglobin in the bloodstream of a subject. The spectroscope measures the reflected intensity for each of the five selected wavelengths, and the arrangement applies these signals to the inputs of the digital or analog processing system. In the analog case, each of the five signals is sent into a pair of input channels. Each of the channels has an amplification factor calculated from the original 16 calibrating measurements. The resulting 10 amplified signals are then processed according to the teachings of the invention to give an output signal representing the concentration ratio of oxygenated blood in the two component system. Since the spectroscope or photometer can be securedly fixed to the subject, and the electrical arrangement operated continuously to process the incoming signals, the concentration ratios can thereby be continuously measured and calculated in a real time, on-line manner.

The processing arrangement may also comprise a general purpose digital computer in which the incoming signals from the spectroscope or photometer are digitized, and then processed by the computer in accordance with the teachings of the invention.

The method and arrangement taught by the present invention may also be utilized in measuring the concentration ratios in an n-component system.

The advantage of the present invention lies in the fact that through a single direct measurement of various wavelengths, one can make a highly accurate measurement of the concentration ratio. The electronic amplification requirements, and the susceptibility to noise is low.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

It is to be understood that the illustrations of signal flow diagrams and the operation flow charts are to be interpreted as including functional representations of microprograms in a general purpose programmable machine usable to accomplish the functions and operations described herein. Since programmable machines can take various forms and are well known and the programming of same to accomplish the described functions can be varied, no detailed description of a particular program is included. A programmer of ordinary skill can construct a program for practicing the present invention based upon the signal flow diagrams or operation flow charts.

DESCRIPTION OF THE PREFERRED EMBODIMENTS

Although the invention may be utilized in measuring the reflection spectra of any two component system, the measurement of hemoglobin reflection spectra is both a practical and important application. There are essentially two different states for hemoglobin: oxygenated hemoglobin ($HbO_2$) and deoxygenated hemoglobin (Hb). Thus, any hemoglobin solution will contain a mixture of various proportions of the two components $k_1 = HbO_2$, and $K_2 = Hb$. We represent the concentration of these two components as $K(k_1)$ and $K(k_2)$, suitably normalized so that $K(k_1) + K(k_2) = 1$.

Figure 1:
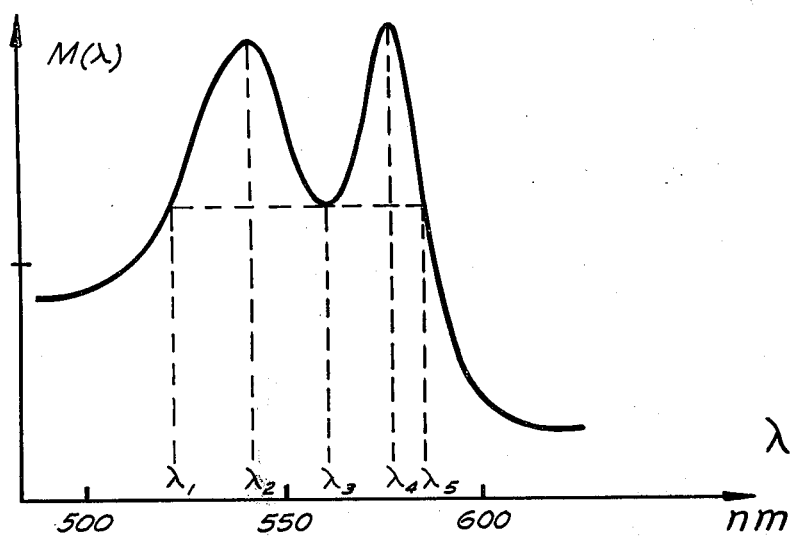
FIG. 1 illustrates the reflection spectra of blood, as measured in a cuvette.

FIG. 1 is a graph illustrating the reflection spectra of hemoglobin, plotting intensity $M(\lambda)$ versus wavelength $\lambda$ in nanometers (nm). The relative minima of the curve corresponds to a wavelength which is designated $\lambda_3$. There are two other points on the curve which correspond to the same reflected intensity $M(\lambda)$; these values are obtained by drawing a tangent to the curve at the minima point, and correspond to wavelengths which are designated by $\lambda_1$ and $\lambda_5$, i.e.

$$M(\lambda_1) = M(\lambda_3) = M(\lambda_5)$$

Wavelengths $\lambda_i$ which are holding this condition are designated as "corresponding wavelengths".

Of course, $\lambda_1$, $\lambda_3$, and $\lambda_5$ may be chosen to be other "corresponding wavelengths", and one can use more than three wavelengths just as well.

The two remaining photometric signals are chosen at the two relative maxima, at wavelengths $\lambda_2$ and $\lambda_4$, owing to their large amplitude and relative stability against changes in wavelength. Of course, the two particular wavelengths may be chosen to lie at two other points of the absorption spectrum as well.

The choice of constants to be eliminated can be simplified if $\lambda_2$ and $\lambda_4$ are likewise "corresponding wavelengths", as would be the case if $\lambda_2$ was the first relative maximum, and then one sought the corresponding wavelength $\lambda_4$ in another region of absorption spectra, corresponding to another relative maximum.

In this manner, one can determine five specific wavelengths $\lambda_1$, $\lambda_2$, $\lambda_3$, $\lambda_4$, and $\lambda_5$ through a known manner of reflection spectrometry measurements, with the skin as the object being examined by the photometric apparatus.

Figure 2:
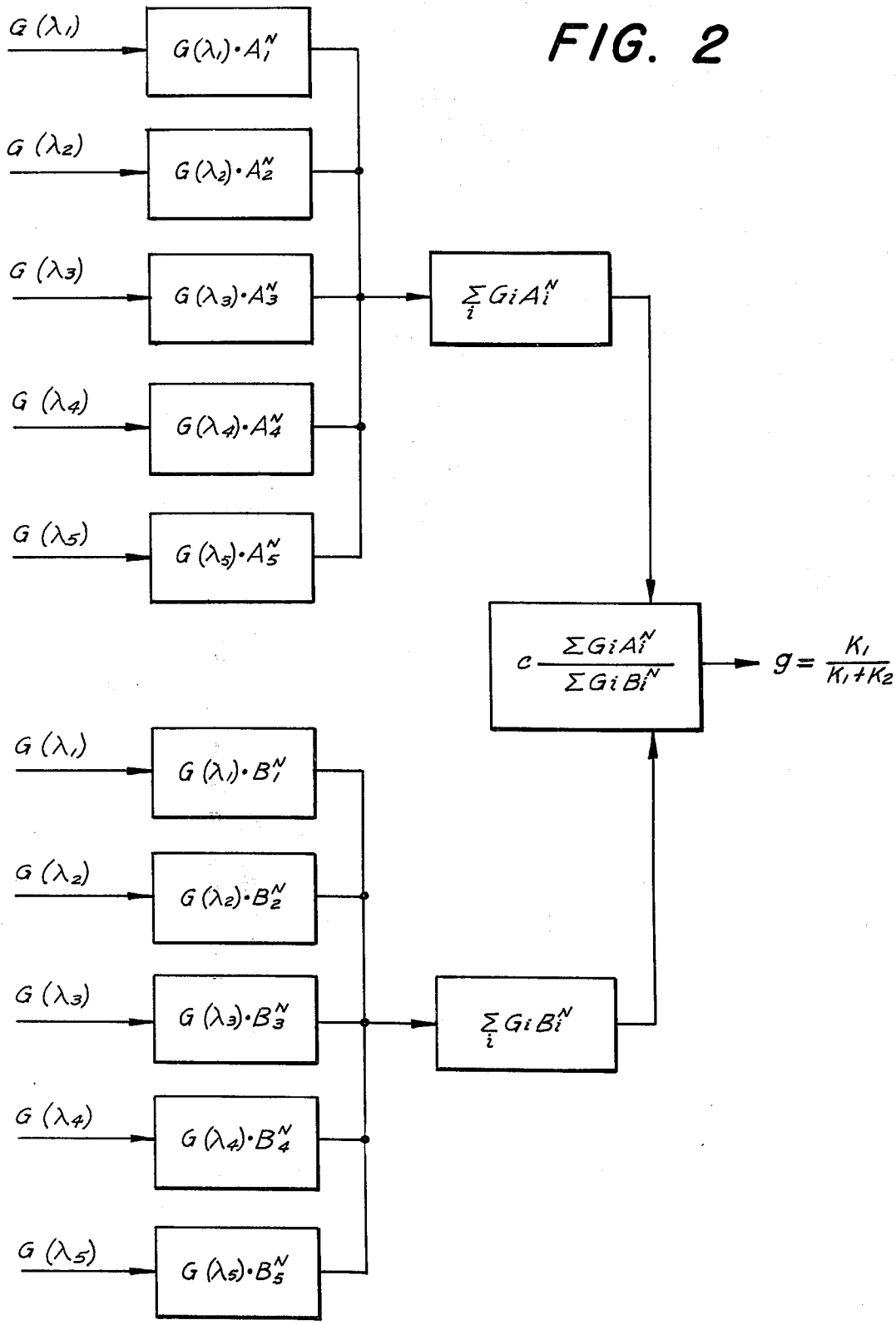
FIG. 2 is a simplified hardware/software flow chart of the method as taught by the present invention.

FIG. 2 is a simplified hardware/software flow chart of the method as provided by the present invention.

Signals $G(\lambda_1)$, $G(\lambda_2)$, $G(\lambda_3)$, $G(\lambda_4)$ and $G(\lambda_5)$ are generated from photometric measurements on the "sample", the surface of the skin, and are applied to a first sequence of amplifiers with a predetermined gain factor. The resulting "weighted" signals are then summed to form a first summed signal.

The same signals $G(\lambda_1)$, $G(\lambda_2)$, $G(\lambda_3)$, $G(\lambda_4)$ and $G(\lambda_5)$ are also applied to a second sequence of amplifiers with other predetermined gain factors. The resulting "weighted" signals are then summed to form a second summed signal.

The first summed signal is then divided by the second summed signal, and multiplied by a scaling constant to produce an output signal. The output signal represents the desired concentration ratio.

Figure 3:
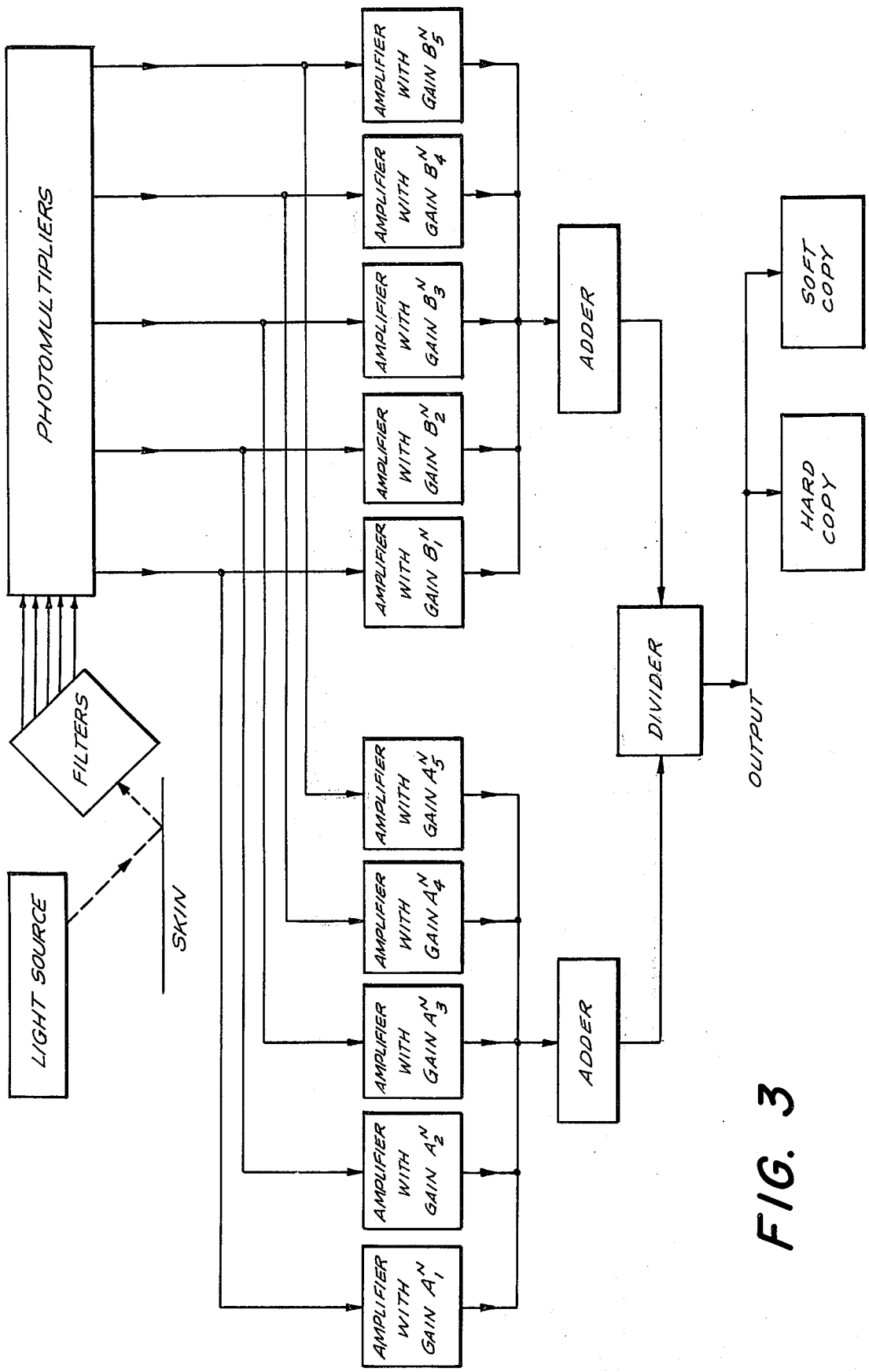
FIG. 3 is a simplified block diagram of an arrangement designed according to the teachings of the present invention.

FIG. 3 is a simplified block diagram of an arrangement designed according to the teachings of the present invention.

There is illustrated a light source, directing either white light or a combination of five predetermined monochromatic beams, onto the surface of the skin. The light is reflected from the skin and passed through a series of light filters, wherein the reflected beam is separated into the five predetermined monochromatic components. The filter arrangement may either consist of plane transmission filters through which the light is reflected, or a rotating transmission filter disk coupled with a synchronous rectifier.

Photomultipliers or other photosensitive detectors are placed behind the respective transmission filters or filter disk to detect the transmitted light intensity. The photomultiplier associated with the filter disk is coupled with the synchronous rectifier giving a time separation to the five respective reflected intensities. The total arrangement is called a spectrophotometer.

The output from the photomultipliers are connected to a first and a second sequence of five signal processors or amplifiers so that each of incoming signals is applied to a distinct signal processor. Each signal processor multiplies the incoming signal, or a digital representation of the signal, by a predetermined gain or weighting factor. Each signal processor has an output which is connected to an adding means, which sums the signals corresponding to the first and second sequences, to form a first and a second summed signal.

The first and second summed signals are then applied to a dividing means, which divides the first summed signal by the second summed signal, or the representations thereof, to produce a ratio signal. The ratio signal is appropriately scaled, i.e. multiplied by a normalizing constant, to form an output signal which represents the desired concentration ratio of the two component system. The output signal may be continuously displayed and monitored, and permanent records kept of its variation in time. These output formats are represented by the "soft copy" and "hard copy" blocks in the Figure respectively.

The principal application envisioned for the present invention is the measurement of oxygenated hemoglobin concentration in a two component system comprising oxygenated and deoxygenated hemoglobin. The measurement may be made directly on the surface of a subject's skin using a rapid spectroscope or photometer. The reflective intensities corresponding to different wavelengths will change depending on the oxygenated hemoglobin concentration in the blood. The simple and convenient continuous monitoring technique provided by the present invention is extremely useful in medical applications.

The reflection intensity for fully oxygenated hemoglobin is represented by $G^{100}$, and fully deoxygenated hemoglobin by $G^o$, as determined by measurements directly from the skin.

The corresponding measurements M made in a cuvette are designated $M^{100}$ and $M^o$, respectively. Subscripts 1 through 5, will be used to designate the wavelengths $\lambda_1, \ldots \lambda_5$ of the beam used in the measurement.

The measurements on an object are simple and extraordinarily stable against a large group of optical disturbances of both linear and non-linear varieties.

It is a key result of the present invention that the concentration ratio of a two-component system is given by:

$$\frac{K_1}{K_1+K_2} = \frac{[(M_3^o-M_5^o)+\beta(M_5^o-M_1^o)]\cdot[(G_3-G_4)+a(G_4-G_2)]-[(M_3^o-M_4^o)+a(M_4^o-M_2^o)][(G_3-G_5)+\beta(G_5-G_1)]}{[(M_3^{100}-M_4^{100})+a(M_4^{100}-M_2^{100})-(M_3^o-M_4^o)+a(M_4^o-M_2^o)]\cdot[(G_3-G_5)+\beta(G_5-G_1)]+[(M_3^o-M_5^o)+\beta(M_5^o-M_1^o)]\cdot[(G_3-G_4)+a(G_4-G_2)]}$$

where $$\beta = \frac{G_3^{100} - G_5^{100}}{G_1^{100} - G_3^{100}}$$

$$a = \frac{(G_4^o - G_3^o)N_o^M - (M_3^o - M_4^o)N_o^G}{(G_4^o - G_2^o)N_o^M - (M_4^o - M_2^o)N_o^G}$$

$N_o^M = (M_3^o - M_5^o) + \beta(M_5^o - M_1^o)$
$N_o^G = (G_3^o - G_5^o) + \beta(G_5^o - G_1^o)$ The calibrating reflective intensities for each component $k_1$ and $k_2$, and for each wavelength $\lambda_1, \ldots \lambda_5$, necessary for the calculation are represented in the table below.

|  | λ1 | λ2 | λ3 | λ4 | λ5 |
|---|---|---|---|---|---|
| $k_1$ [$G^{100}$] | $G_1^{100}$ | — | $G_3^{100}$ | — | $G_5^{100}$ |
| $k_2$ [$G^o$] | $G_1^o$ | $G_2^o$ | $G_3^o$ | $G_4^o$ | $G_5^o$ |
| $k_1$ [$M^{100}$] | — | $M_2^{100}$ | $M_3^{100}$ | $M_4^{100}$ | — |
| $k_2$ [$M^o$] | $M_1^o$ | $M_2^o$ | $M_3^o$ | $M_4^o$ | $M_5^o$ |

The concentration ratio may also be written in the form $$\frac{k_1}{k_1+k_2} = \frac{\sum_{i=1}^{5} A_i^x G(\lambda_i)}{\sum_{i=1}^{5} B_i^x G(\lambda_j)}$$

where $A_i^x, B_j^x, N_o^M, N_o^G, P_o, P_{100}, a, \beta$
$A_1^x = P_o \beta$
$A_2^x = N_o^M a$
$A_3^x = -N_o^M - P_o$
$A_4^x = N_o^M (1-a)$
$A_5^x = P_o(1-a)$
$N_o^M = M_3^o - \beta M_1^o - (1-\beta)M_5^o$
$N_o^G = G_3^o - \beta G_1^o - (1-\beta)G_5^o$
$P_o = aG_2^o + (1-a)G_4^o - G_3^o$
$P_{100} = aG_2^{100} + (1-a)G_4^{100} - G_3^{100}$ $B_1^x = -\beta(P_{100} - P_o)$
$B_2^x = aN_o^M$
$B_3^x = (P_{100} - P_o) - N_o^M$
$B_4^x = (1-a)N_o^M$
$B_5^x = (1-\beta)(P_{100} - P_o)$ $$\beta = \frac{G_3^{100} - G_5^{100}}{G_1^{100} - G_3^{100}}$$

$$a = \frac{(G_4^o - G_3^o)N_o^M - (M_3^o - M_4^o)N_o^G}{(G_4^o - G_2^o)N_o^M - (M_4^o - M_2^o)N_o^G}$$

Calculation of the Gain Factors

Let us write
$$P = B_1 g + B_2$$
where $B_1$ and $B_2$ are constants, and $g$ is the degree of oxygenation of the hemoglobin, $0 < g < 1$. $P$ and $Q$ represent the two components of the system.
Then
$$P_o = B_2$$
$$P_{100} = B_1 + B_2$$
so
$$P = (P_{100} - P_o)g + P_o$$

Similarly, Q is given by
$$Q = (Q_{100} - Q_o)g + Q_o$$

Now, consider the ratio $$V = \frac{P}{Q} = \frac{(P_{100} - P_o)g + P_o}{(Q_{100} - Q_o)g + Q_o}$$

and solve for $g$ in terms of $v$:
$(Q_{100} - Q_o)gv + Q_o V = (P_{100} - P_o)g + P_o$
$[(Q_{100} - Q_o)v - (P_{100} - P_o)]g = P_o - Q_o V$ $$g = \frac{P_o - Q_o v}{(Q_{100} - Q_o)v - (P_{100} - P_o)}$$

$$= \frac{P_o - Q_o \frac{P}{Q}}{(Q_{100} - Q_o)\frac{P}{Q} - (P_{100} - P_o)}$$

$$= \frac{P_o Q - Q_o P}{(Q_{100} - Q_o)P - (P_{100} - P_o)Q}$$

We have the following relationships:
$$P = aG_2 + (1-a)G_4 - G_3 \quad (1)$$
$$Q = aG_2 + (1-a)G_4 - \beta G_1 - (1-\beta)G_5$$

We can make the following simplification by setting
$N = Q - P$
$= G_3 - \beta G_1 - (1-\beta)G_5$
to eliminate $Q$
$Q = N + P$
$Q_{100} = N_{100} + P_{100}$ However, we note
$N_{100} = G_3^{100} - \beta G_1^{100} - (1-\beta)G_5^{100}$ As we have stated above, $\lambda_1$, $\lambda_3$, and $\lambda_5$ are chosen so that the reflected intensities at each of these wavelengths are equal, i.e.
$G_3^{100} = G_1^{100} = G_5^{100}$
Therefore, $N_{100} \equiv 0$.

Then $$g = \frac{P_o(N+P) - (N_o + P_o)P}{(P_{100} - N_o - P_o)P - (P_{100} - P_o)(N+P)}$$

$$= \frac{P_o N - N_o P}{N(P_o - P_{100}) - PN_o}$$

$$= \frac{N_o P - P_o N}{N(P_{100} - P_o) + PN_o}$$

We can then write $$g = \frac{\sum_{i=1}^{5} A_i^N G_i}{\sum_{i=1}^{5} B_i^N G_i}$$

with the simplified elimination constants $A_i^N$, $B_i^N$.

The numerator of the above expression is
$N_o P - P_o N$
$= N_o[aG_2 + (1-a)G_4 - G_3] - P_o[G_3 - G_1 - (1-\beta)G_5]$, and consequently the constants $A_i^N$ are:
$A_1^N = P_o \beta$
$A_2^N = N_o a$
$A_3^N = -N_o - P_o$
$A_4^N = N_o(1-a)$
$A_5^N = P_o(1-\beta)$ Similarly, from the denominator of $g$ we can derive:
$B_1^N = -\beta(P_{100} - P_o)$
$B_2^N = aN_o$
$B_3^N = (P_{100} - P_o) - N_o$
$B_4^N = (1-a)N_o$
$B_5^N = -(1-\beta)(P_{100} - P_o)$ The method according to the present invention has several advantages. It is possible to eliminate resulting distortion in color due to the additive mixing of various colors, while determining the values for $a$ and $\beta$ through the various quotients and differences associated with the equation for $g$.

Furthermore, the difference between the measurement $G(\lambda)$ on the skin, and $M(\lambda)$ in a single cuvette reduces solely to a wavelength-dependent interference function $S(\lambda)$ as was shown by Lübbers and Wodick (Pflügers Archiv 342, 41–60 (1973)), utilizing color dyes or specially prepared test mixtures whose measurement range included the three particular wavelengths under consideration. Therefore, $S(\lambda)$ may be easily determined by wavelengths with particularly closely corresponding absorption or reflectivity values. Such wavelengths will henceforth be referred to as "corresponding wavelengths."

The interference function will by assumption change very little during the measuring process or in the relation to the entire reaction, with the particular wavelengths $\lambda_1$, $\lambda_2$, $\lambda_3$ constant, and the corresponding functional values $S(\lambda_1)$, $S(\lambda_2)$, and $S(\lambda_3)$. These interference functions can be eliminated through the use of weight factors $\gamma_1$, $\gamma_2$, $\gamma_3$:

One has:
$$\gamma_1 \cdot S(\lambda_1) + \gamma_2 \cdot S(\lambda_2) + \gamma_3 \cdot S(\lambda_3) = 0 \quad (2)$$

One can use less than three weight factors by simply rewriting the equation $$\gamma_1 S(\lambda_1) + \gamma_2 \cdot S(\lambda_2) = -\gamma_3 S(\lambda_3)$$

$$-\frac{\gamma_1}{\gamma_3} S(\lambda_1) - \frac{\gamma_2}{\gamma_3} S(\lambda_2) = S(\lambda_3)$$

Since the weight factors are normalized $$-\frac{\gamma_1}{\gamma_3} - \frac{\gamma_2}{\gamma_3} - 1 = 0$$

we can set $$-\frac{\gamma_1}{\gamma_3} = a$$

$$-\frac{\gamma_2}{\gamma_3} = 1 - a$$

and equation (2) becomes $$[aS(\lambda_1) + (1-a)S(\lambda_2)] - S(\lambda_3) = 0 \quad (3)$$

In this manner, the interference functions can be eliminated, permitting the desired concentration ratio to be expressed as in equation (1) above. The ratio $k_1/k_1+k_2$ may be determined through two additional measurements with two different wavelengths $\lambda_4$ and $\lambda_5$.

Rewriting equation (3) as $$a[S(\lambda_1) - S(\lambda_2)] + S(\lambda_2) - S(\lambda_3) = 0$$

the interference function can thus be eliminated through measuring the difference at two particular wavelengths, and multiplying one of the differences by a constant $a$.

Thus all constants except for $\beta$ and $a$ can be determined from the cuvette spectrum of hemoglobin, for oxygenated and deoxygenated hemoglobin, respectively.

The value of $\beta$ must be obtained for oxygenated hemoglobin from a direct measurement on the skin:

$$\beta = \frac{G_3^{100} - G_5^{100}}{G_1^{100} - G_3^{100}}$$

The value of $a$ for deoxygenated hemoglobin must also be obtained from a direct measurement on the skin:

$$a = \frac{(G_4^o - G_3^o)N_o^M - (M_3^o - M_4^o)N_o^G}{(G_4^o - G_2^o)N_o^M - (M_4^o - M_2^o)N_o^G}$$

where $N_o^M$ corresponds to a measurement in a cuvette, and $N_o^G$ to a measurement on the skin.

Once $\beta$ is determined, $a$ can be determined.

When $a$ and $\beta$ have been determined, then the constants $A_i^N$ and $B_i^N$ can be computed on the basis of the calibrating measurements $N_o$, $P_o$, $P_{100}$.

For example, from measurements on the skin (say, of the lower fingertip) one may find reflective intensity values giving
$\beta = 0.2$
and
$a = 0.4$ For the calculation, the coefficients in the formula for $g$ are also predetermined from the calibrating measurements:

$$g = \frac{7.8 + 6.2v}{25 - 11v}$$

or with $v = P/Q$ $$g = \frac{7.8Q + 6.2P}{25Q - 11P} \qquad (4)$$

Inserting the values for $\beta$ and $a$ into equation (1):
$P = 0.4G_2 + 0.6G_4 - G_3$
$Q = 0.4G_2 + 0.6G_4 - 0.2G_1 - 0.8G_5$ Substituting these values for $P$ and $Q$ into formula (4) above,
we have $$g = \frac{-1.56\,G_1 + 5.6\,G_2 - 6.2\,G_3 + 8.4\,G_4 - 6.24\,G_5}{-5\,G_1 + 5.6\,G_2 + 11\,G_3 + 8.4\,G_4 - 20\,G_5} \qquad (5)$$

To practice the present invention, one now need only apply the spectrometer to the surface of the skin and measure the five reflected intensities $G_1$, $G_2$, $G_3$, $G_4$, and $G_5$.

The resulting signals may be digitized, and inserted into a programmable calculator or computer, programmed to calculate the above formula, or the calculation may be done by hand using the formula (5) above.

The signals may also be inserted into an analog computer, and the same calculation performed.

The measurements of the reflected intensities may be made on a continuous basis, and the computations performed on a on-line, real time computer.

It will be understood that each of the elements described above, or two or more together, may also find a useful application in other types of concentration ratio measuring arrangements differing from the types described above.

While the invention has been illustrated and described as embodied in a method and apparatus for photometrically measuring the concentration ratio of a two component system, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of photometrically measuring the concentration ratio of the two components of a two-component system, comprising
   a. directing five monochromatic light beams having respective ones of five predetermined wavelengths towards the system while only the first component is present in the system, and measuring the intensity of the five beams at portions thereof directed away from the system, these measured intensities constituting calibrating intensities;
   b. directing three monochromatic light beams having respective ones of a predetermined three of the five wavelengths towards the system while only the second component is present in the system, and measuring the intensity of the three beams at portions thereof directed away from the system, these measured intensities constituting additional calibrating intensities;
   c. directing five monochromatic light beams having respective ones of the five wavelengths towards the first component with the first component removed from the system and separated from the second component, and measuring the intensity of the five beams at portions thereof directed away from the first component, these measured intensities constituting further calibrating intensities;
   d. directing three monochromatic light beams having respective ones of a predetermined three of the five wavelengths towards the second component with the second component removed from the system and separated from the first component, and measuring the intensity of the three beams at portions thereof directed away from the second component, these measured intensities constituting still further calibrating intensities;
   e. directing five monochromatic light beams having respective ones of the five wavelengths towards the system while both the first and the second component are present in the system, and measuring the intensity of the five beams at portions thereof directed away from the system, these measured intensities constituting system intensities; and
   f. deriving the relative concentrations of the two components in the system from the values of the calibrating intensities and of the system intensities.

2. A method as defined in claim 1, wherein in performing at least one of steps ($a$) to ($e$) at least portions of the light beams employed in the step coincide with each other.

3. A method as defined in claim 1, wherein in performing at least one of steps ($a$) to ($e$) at least portions of the monochromatic light beams employed in the step coincide and are constituent components of a beam of light having a continuous rather than a discrete spectral wavelength distribution.

4. A method as defined in claim 3, wherein the beam having a continuous spectral wavelength distribution is a beam of white light.

5. A method as defined in claim 1, wherein step ($e$) comprises generating five system signals corresponding to the five system intensities, wherein step ($f$) comprises generating five first weighted signals and five second weighted signals having values corresponding to respective ones of the five system signals multiplied by respective ones of five first weighting factors and five second weighting factors derived from the sixteen calibrating intensities measured in steps ($a$) to ($d$), adding said five first weighted signals together to form a first summed signal and adding said five second weighted signals together to form a second summed signal, generating a ratio signal by effecting division of the first summed signal by the second signal, and normalizing the ratio signal to produce a normalized ratio signal.

6. A method as defined in claim 5, wherein in steps ($c$) and ($d$) the first and the second component, respectively, is located in a test cuvette, and wherein the values of said five system signals are respectively designated by $G(\lambda_1)$, $G(\lambda_2)$, $G(\lambda_3)$, $G(\lambda_4)$ and $G(\lambda_5)$.

7. A method as defined in claim 6, wherein said calibrating intensities for each of said components at each wavelength are $G_1^{100}$, $G_3^{100}$ and $G_5^{100}$, for wavelengths $\lambda_1$, $\lambda_3$, and $\lambda_5$, respectively, for first component $k_1$ having a concentration of 100% as measured in said system; $G_1^0$, $G_2^0$, $G_3^0$, $G_4^0$, and $G_5^0$ for wavelengths $\lambda_1$, $\lambda_2$, $\lambda_3$, $\lambda_4$, and $\lambda_5$, respectively, for second component $k_2$ having a relative concentration of 100% as measured in said system; $M_2^{100}$, $M_3^{100}$, and $M_4^{100}$ for wavelengths $\lambda_2$, $\lambda_3$, and $\lambda_4$, respectively, for first component $k_1$ having a relative concentration of 100% as measured in a test cuvette; $M_1^o$, $M_2^o$, $M_3^o$, $M_4^o$, and $M_5^o$ for wavelengths $\lambda_1$, $\lambda_2$, $\lambda_3$, $\lambda_4$, and $\lambda_5$, respectively, for second component $k_2$ having a relative concentration of 100% as measured in a test cuvette; said first weighting factors are $A_1^N$, $A_2^N$, $A_3^N$, $A_4^N$, and $A_5^N$; said second weighting factors are $B_1^N$, $B_2^N$, $B_3^N$, $B_4^N$, and $B_5^N$; said weighting factors being given by $$A_1^N = P_o \beta$$
$$A_2^N = N_o^M a$$
$$A_3^N = -N_o^M - P_o$$
$$A_4^N = N_o^M(1-a)$$
$$A_5^N = P_o(1-a)$$
$$B_1^N = -\beta(P_{100} - P_o)$$
$$B_2^N = a N_o^M$$
$$B_3^N = (P_{100} - P_o) - N_o^M$$
$$B_4^N = (1-a) N_o^M$$
$$B_5^N = (1-\beta)(P_{100} - P_o)$$

where $$N_o^M = M_3^o - \beta M_1^o - (1-\beta)M_5^o$$
$$N_o^G = G_3^o - \beta G_1^o - (1-\beta)G_5^o$$
$$P_o = aG_2^o + (1-a)G_4^o - G_3^o$$
$$P_{100} = aG_2^{100} + (1-a)G_4^{100} - G_3^{100}$$

with $$\beta = \frac{G_3^{100} - G_5^{100}}{G_1^{100} - G_3^{100}}$$

$$a = \frac{(G_4^o - G_3^o)N_o^M - (M_3^o - M_4^o)N_o^G}{(G_4^o - G_2^o)N_o^M - (M_4^o - M_2^o)N_o^G}$$

the concentration ratio being calculated by $$\frac{K_1}{K_1 + K_2} = \frac{\sum_{i=1}^{5} A_i^N G(\lambda i)}{\sum_{j=1}^{5} B_j^N G(\lambda j)}$$

8. A method as defined in claim 1, wherein said two component system has a reflection spectra curve of reflected intensity and wavelength, said curve having a relative minimum and two relative maxima, and wherein one of the five wavelengths corresponds to said relative minimum, and two further ones of the five wavelengths respectively correspond to said relative maxima.

9. A method as defined in claim 8, wherein the remaining two of the five wavelengths and also the wavelength which corresponds to said relative minimum are all associated with the same intensity value on said curve.

10. A method as defined in claim 8, wherein said two relative maxima are equal.

11. A method as defined in claim 1, wherein said first component is oxygenated hemoglobin, and said second component is deoxygenated hemoglobin.

12. An arrangement for photometrically measuring the concentration ratio of a two component system comprising a source of five monochromatic light beams of different wavelengths; a spectrophotometer, capable of measuring the reflective intensity of said light beams from a sample comprising at least one of said components, thereby producing reflected sample intensity signals; amplifying means connected to said spectrophotometer to multiply each of said reflected sample intensity signals by a predetermined gain factor to thereby produce weighted signals; adding means, serving to add predetermined combinations of said weighted signals; dividing means, serving to divide two of said predetermined combinations thereby producing an output signal; and read-out means, serving to display said output signal.

* * * * *